M. E. COVERT.
COLANDER.
APPLICATION FILED JULY 12, 1915.
1,197,447.
Patented Sept. 5, 1916.
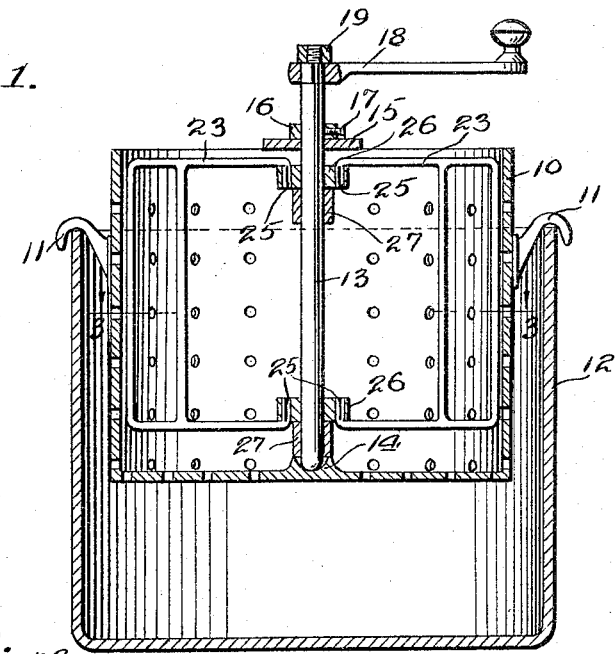
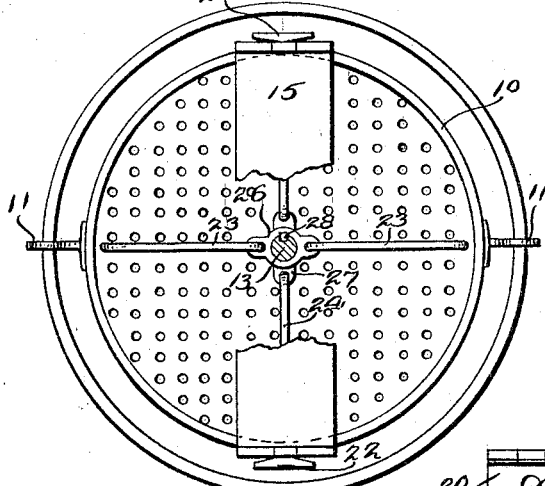
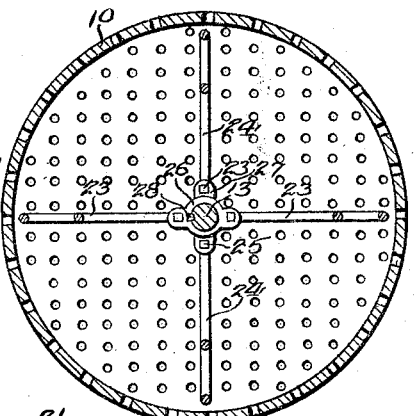
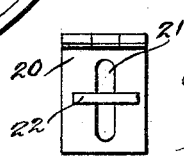
Inventor
Martha E. Covert.
Witnesses
Edw. S. Hall.
Ross J. Woodward.
By Richard Owen.
Attorney

UNITED STATES PATENT OFFICE.

MARTHA E. COVERT, OF DEERTRAIL, COLORADO.

COLANDER.

1,197,447.  Specification of Letters Patent.  Patented Sept. 5, 1916.

Application filed July 12, 1915. Serial No. 39,443.

*To all whom it may concern:*

Be it known that I, MARTHA E. COVERT, a citizen of the United States, residing at Deertrail, in the county of Arapahoe and State of Colorado, have invented certain new and useful Improvements in Colanders, of which the following is a specifictaion.

This invention relates to an improved colander and the principal object of the invention is to provide a colander which may be suspended in a saucepan or other receptacle while in use, the colander being provided with improved means for forcing material through the openings in the sides and bottom of the colander.

Another object of the invention is to so construct the operating means of the colander as to permit of the same being disassembled very easily when it is desired to clean the colander.

Another object of the invention is to provide a colander having an improved means for rotatably supporting the operating means.

Another object of the invention is to provide a colander which will be very simple in construction and easy to assemble.

This invention is illustrated in the accompanying drawings, wherein:—

Figure 1 is a view showing the colander in vertical section, Fig. 2 is a top plan view of the colander with the cross board broken away and the shaft shown in section, and Fig. 3 is a transverse sectional view through the colander taken along 3—3 of Fig. 1. Fig. 4 is a view showing the manner of releasably holding the cross bar in engagement with the colander.

The body portion or receptacle 10 of the colander is perforated as shown in the drawing and is provided with hooks 11 so that the colander can be suspended in a saucepan or bowl or other receptacle 12. Therefore material squeezed through openings in the colander will drop into the receptacle 12 provided to receive the same. It should also be noted that these hooks will afford convenient means for lifting the colander and placing the same in the receptacle 12 or removing the colander from the receptacle.

The driving shaft 13 extends vertically in the colander and has its lower end portion mounted in a bearing 14 formed in the bottom of the colander. This shaft passes through an opening in the cross bar or bearing board 15 and is provided with a collar 16 positioned above the board 15 and releasably held in an adjusted position by means of set screw 17. This collar 16 holds the shaft in the desired position and prevents too much weight being placed upon the bearing 14. Therefore the shaft can be easily rotated by means of the crank handle 18 which is placed upon the upper end of the shaft and releasably held in place by means of the securing nut 19. The cross bar or board 15 extends across the upper portion of the colander as shown in Fig. 2 and is provided with hingedly connected side wings 20 which extend down the sides of the colander and are provided with slots 21 through which the securing keys 22 are passed and then turned to the locking position shown in Fig. 4.

The rubbers 23 and 24 are substantially U-shaped as shown in Fig. 1 and have their end portions bent to form hooks 25 so that the rubbers may be connected with the collars 26 and 27 removably clasped upon the shaft 13 by means of teeth 28. The rubbers 23 extend at right angles to the rubbers 24, the rubbers 24 traveling close to the bottom of the colander so that the material placed in the colander will be squeezed through the openings in the bottom thereof.

When in use the rubbers will be connected with the driving shaft 13 by means of the collars and the driving shaft will then be passed through the cross bar or bearing board 15 after which the collar 16 will be secured in the proper place and the cross bar connected with the colander by means of the keys 22. The handle can then be put in place and the colander is ready for use. The material to be strained will then be placed in the colander and by turning the handle 18 will be worked through the openings in the colander by means of the rubbers. After the material has been forced through the colander the hooks 11 will be grasped and the colander can then be easily removed and cleaned. With some materials it will be necessary to disassemble the colander when cleaning the same but with others it will of course only be necessary to wash off the colander and put the same away.

What is claimed is:—

A colander including a body portion, a bearing extending above the bottom thereof, a rotatable shaft extending vertically in said body portion and fitting in said bearing, upper and lower sets of collars fitting upon said shaft and keyed to the shaft to prevent rotary movement of the collars upon the shaft, the collars of the sets contacting and the lower collar of the lower set engaging said bearing, said collars being provided with side ears having openings formed therein, each set of collars having the ears of one collar extending at substantially right angles to the ears of the second collar, and rubbers having end bars and upper and lower bars extending from the end bars and terminating in fingers fitting into the openings of said ears to connect the rubbers with the collars.

In testimony whereof I affix my signature in presence of two witnesses.

MARTHA E. COVERT.

Witnesses:
R. C. TILTON,
GERALD H. WOOD.

Copies of this patent may be obtained for five cents each, by addressing the "Commissioner of Patents, Washington, D. C."